US006998177B2

(12) United States Patent
Krzyzak et al.

(10) Patent No.: US 6,998,177 B2
(45) Date of Patent: Feb. 14, 2006

(54) METHOD OF MAKING A GLASS BODY WITH A PHOSPHOROUS- AND POROUS SIO$_2$-CONTAINING COATING, GLASS BODY MADE THEREBY AND SOLUTION FOR MAKING SAME

(75) Inventors: Marta Krzyzak, Clausthal-Zellerfeld (DE); Gundula Helsch, Clausthal-Zellerfeld (DE); Gerhard Heide, Clausthal-Zellerfeld (DE); Guenther Heinz Frischat, Clausthal-Zellerfeld (DE)

(73) Assignee: Schott AG, Mainz (DE)

( * ) Notice: Subject to any disclaimer, the term of this patent is extended or adjusted under 35 U.S.C. 154(b) by 9 days.

(21) Appl. No.: 10/379,647

(22) Filed: Mar. 5, 2003

(65) Prior Publication Data
US 2003/0170465 A1    Sep. 11, 2003

(30) Foreign Application Priority Data
Mar. 6, 2002    (DE)    ................................. 102 09 949

(51) Int. Cl.
*B32B 9/00*    (2006.01)
(52) U.S. Cl. ...................... 428/428; 428/697; 428/701; 428/702; 501/54; 106/287.29; 106/287.34
(58) Field of Classification Search ................ 428/428, 428/432, 697, 701, 702; 501/54; 106/287.29, 106/287.34
See application file for complete search history.

(56) References Cited

U.S. PATENT DOCUMENTS

| | | | |
|---|---|---|---|
| 2,601,123 A | | 6/1952 | Moulton |
| 5,330,941 A | * | 7/1994 | Yaba et al. ................... 501/54 |
| 5,770,535 A | * | 6/1998 | Brix et al. ................... 501/67 |
| 5,908,703 A | * | 6/1999 | Brix et al. .................. 428/426 |
| 6,087,284 A | * | 7/2000 | Brix et al. ................... 501/69 |
| 6,417,124 B1 | * | 7/2002 | Peuchert et al. .............. 501/66 |
| 6,465,381 B1 | * | 10/2002 | Lautenschlager et al. ..... 501/67 |
| 6,671,026 B2 | * | 12/2003 | Peuchert et al. ............ 349/158 |
| 2003/0059540 A1 | * | 3/2003 | Berni et al. .............. 427/376.1 |

FOREIGN PATENT DOCUMENTS

| | | |
|---|---|---|
| DE | 1 941 191 | 1/1971 |
| DE | 196 42 419 A1 | 4/1998 |
| DE | 199 18 811 A1 | 11/2000 |
| DE | 100 18 697 A1 | 10/2001 |
| EP | 0 897 898 A2 | 2/1999 |

OTHER PUBLICATIONS

K. Cathro, et al: "Silica Low-Reflection Coatings For Collector . . . ", Salar Energy vol. 32, No. 5, pp. 573-579, 1984.
Helsch, Journal of Non-Crystalline Solids 262 (2000), pp. 193-197.
Database Inspec 'Online' Institute of Electrical Engineers, Stevenage, GB; Catho, K., et al: "Silica Low-Reflection Coatings . . . " Database Accession No. 2251283 XP002244628 & Solar Energy, 1984, USA BD, 32, NR. 5, pp. 573-579.
Patent Abstract of Japan JP 01 036770 A, Feb. 7, 1989.
Database WPI Section CH Week 199407, Derwent Publications Ltd, London, GB; JP 06 005232, Jan. 14, 1994.
D' Apuzzo M., et al: "Sol-Gel Synthesis of Humidity . . . " Journal of Sol-Gel Science and Technology, Kluwer Academic Publishers, Dordrecht, NL, BD. 17, NR. 3, Mar. 2000, pp. 247-254.

* cited by examiner

*Primary Examiner*—Deborah Jones
*Assistant Examiner*—G. Blackwell
(74) *Attorney, Agent, or Firm*—Michael J. Striker

(57) ABSTRACT

The alkali-free or alkali-poor glass body is provided with an adherent and anti-reflective coating on at least one of its sides. The coating contains $P_2O_5$ and porous $SiO_2$, preferably in a weight ratio of $SiO_2$ to $P_2O_5$ of 10:1 to 1:1. It has a rubbing resistance criterion according to DIN 58196, intensity of testing H50, of 2 or better. The method of providing the glass body with the coating includes dipping the glass body in a $H_3PO_4$- and $SiO_2$-containing volatile solution, withdrawing the glass body at a speed of from 1 mm/s to 20 mm/s from the solution and tempering the glass body at a temperature of under $T_g$ of the glass.

27 Claims, No Drawings

METHOD OF MAKING A GLASS BODY WITH A PHOSPHOROUS- AND POROUS SiO₂-CONTAINING COATING, GLASS BODY MADE THEREBY AND SOLUTION FOR MAKING SAME

BACKGROUND OF THE INVENTION

1. Field of the Invention

The present invention relates to a glass body with a porous coating and method for making it as well as a solution for making the porous coating.

2. Description of the Related Art

EP 0 897 898 A2 describes a method for depositing an optical coating on a flat glass plate composed of soda lime glass by means of a sol or sol mixture.

In U.S. Pat. No. A 2,601,123 a method of making a porous $SiO_2$ coating on glass is described. This sol gel coating method based on the use of a sol with a highly dispersed $SiO_2$ particles comprises a simple dipping step that provides a porous $SiO_2$ coating on soda lime glass.

DE 199 18 811 A1 discloses a process, in which a standard pre-stressed safety glass, also a soda lime glass, is provided with a porous $SiO_2$ coating.

Also DE 196 42 419 A1 and DE 100 18 697 A1 describe methods for making porous coatings.

A typical composition of soda lime glass, in percent by weight on an oxide basis, is 72%, $SiO_2$; 14%, $Na_2O(+K_2O)$; 9%, CaO; 3to 4%, MgO; and 1%, $Al_2O_3$.

DE 1 941 191 describes a process for making transparent, glassy, crystalline or glassy-crystalline inorganic multi-component materials, preferably in thin layers. Above all, sensitive glasses that can be attacked, for example, by water should be protected with these layers.

K. Cathro, D. Constable u. T. Solaga, state that porous $SiO_2$ coatings adhere only poorly to borosilicate glass in Solar Energy 32 [5], p. 573 (1984). A modification of this method which is especially applicable to PYREX® is suggested, in which an after-treatment step in which the glass is immersed in a sodium bicarbonate ($NaHCO_3$) solution is required. Because of that this method is expensive and extensive. Furthermore accelerated aging takes place because of $Na_2CO_3$ particles in the coating surface, which leads to a reduction of the transmission, as described by Helsch, Journal of Non-Crystalline Solids, 265, pp. 193 to 197 (2000).

The poor adherence of porous $SiO_2$ coatings is also a problem for other chemically resistant glasses, with alkali-poor or alkali-free glasses, for example, silica glass.

SUMMARY OF THE INVENTION

It is an object of the present invention to prepare an anti-reflective coated alkali-poor or alkali-free glass body, for example quartz glass, having a coating with increased adherence and wash resistance.

This object is attained by an alkali-free or alkali-poor glass body according to the invention, preferably a borosilicate glass body, which has a porous coating at least on one of its sides, which contains phosphorus as well as $SiO_2$. This anti-reflective coating on this body is both adherent and wash resistant.

The alkali-poor or alkali-free glass is understood to mean a glass that contains no alkali metal oxides or less than 12 percent by weight alkali metal oxides in the context of the present invention.

The rubbing test according to DIN 58196-5 provides a measure of the adherence and wash resistance of the coating. A coating on a body that fulfills the test criterion of 2 or better (no rubbed off material, only rubbing scratches or tracks detectable) during the testing according to this DIN procedure is very rubbing resistant and thus also very adherent and very wash resistant.

In a preferred embodiment of the invention the phosphorus provided in the coating is provided by a phosphorus oxide compound. Good results were obtained for the rubbing resistance with the phosphorus oxide compounds.

A glass body, which contains from 1 to 20 percent by weight, preferably at least 3 percent by weight, and especially preferably at least 7 percent by weight, of a boron oxide ingredient, is especially preferred.

In a particularly preferred embodiment of the invention the glass body according to the invention has a composition (in percent by weight on an oxide basis) of from 70 to 85 percent by weight, $SiO_2$; from 7 to 15 percent by weight, $B_2O_3$; from 2 to less than 12 percent by weight, preferably from 2 to less than 10 percent by weight, $Na_2O+K_2O$; from 1 to 8, preferably from 1 to 7, percent by weight, $Al_2O_3$; from 0 to 11, percent by weight RO, wherein RO represents one or more ingredient from the group consisting of MgO, CaO, SrO, BaO and ZnO.

A glass body, which has an alkali oxide content of from 0 to less than 5 percent by weight, preferably from 0 to 1 percent by weight, is also a preferred embodiment of the invention.

In an especially preferred embodiment the glass body according to the invention the glass body contains (in percent by weight on an oxide basis) of from 40 to 60 percent by weight, $SiO_2$; from 7 to 15 percent by weight, $B_2O_3$; from 8 to 20 percent by weight, $Al_2O_3$; from 0 to 30 percent by weight RO, wherein RO represents one or more ingredient from the group consisting of MgO, CaO, SrO, BaO and ZnO.

A preferred embodiment of the coated glass body according to the invention has a gises body with a $SiO_2$ content of at least 95% by weight. An especially preferred embodiment of the glass body contains at least 99 percent by weight of $SiO_2$. A most preferred embodiment comprises quartz glass.

A preferred embodiment of the invention is a coated glass body having a coating with a pore diameter of 2 nm to 50 nm. In this pore size range good reflection reduction is obtained.

Another preferred embodiment of the invention comprises a coated glass body, in which the coating has a porosity, which amounts to 10 to 60 percent of the total volume of the coating. In this range for the porosity good reflection reduction is obtained.

A coated glass body in which the weight ratio of $SiO_2$ to $P_2O_5$ in the coating amounts to 10:1 to 1:1 is especially preferred. Especially good rubbing resistance is attained with these ratios of $SiO_2$ to $P_2O_5$.

A coated glass body in which the weight ratio of $SiO_2$ to $P_2O_5$ in the coating amounts to 3:1 to 1.2:1 is even better. Particularly good rubbing resistance is attained with these ratios of $SiO_2$ to $P_2O_5$.

An additional preferred embodiment of The invention comprises a coated glass body having a coating thickness of 50 nm to 500 nm. Good reflection reduction is obtained when the coating thickness is in this range.

In an especially preferred embodiment of the invention the coated glass body has a coating thickness of from 80 nm to 160 nm. Good reflection reduction is obtained when the coating thickness is in this range.

The porous coating on the glass body according to the invention for example can be produced by application of a solution. The solution can, for example, be applied by spraying, casting or dipping.

A method of making the glass body according to the invention includes a) dipping the glass body in a volatile solution containing $H_3PO_4$ and $SiO_2$, b) withdrawing the glass body from the solution; and c) tempering the glass body at a temperature under $T_g$ of the glass.

Coated glass is made by the method according to the invention having coatings that have a high adherence, a high wash fastness and a high reflection reduction. With the method according to the invention the coating can preferably be made rubbing resistant in a single step. After dipping or immersing the glass body must no longer be dipped in a $NaHCO_3$ solution, which up to now in the known method was required to make a porous coating on borosilicate glass. That means that the method has a great commercial advantage. The method is performed faster, since less processing time is required. The required number of plant components is reduced. Raw material need is reduced. Waste disposal of spent $NaHCO_3$ solution is no longer needed.

The above-described method is outstandingly suitable for alkali-free or alkali poor glasses.

The glass body can be pre-cleaned in one or more cleaning steps prior to the dipping or immersing. For example, water, lower chain alcohols or ketones can be used as the cleaning agent in the pre-cleaning.

According to a preferred embodiment the glass body is withdrawn from the solution in method step b) at a speed of 0.1 mm/s to 100 mm/s, preferably from 1 mm/s to 20 mm/s. Higher drawing speeds are possible by lowering the viscosity. The lower viscosity of the solution is achieved, for example, by reducing the content of $SiO_2$ and $H_3PO_4$ and by changing the solvent.

According to the invention the solution, which is suitable for use in the above-described manufacturing methods and for coating the various alkali-free to alkali-poor glass bodies, contains an $SiO_2$ sol and $H_3PO_4$ and one or more additional acids, which adjust the pH to 1 or 2, as well as a solvent. The solution preferably contains HCl or $HNO_3$ as the acid ingredient. The solution contains one or more lower chain alcohols.

A preferred embodiment of the solution according to the invention for making the porous $SiO_2$- and phosphorus-containing coating contains from 0.1 to 2 percent by weight HCl or from 0.1 to 2 percent by weight $HNO_3$, from 0.1 to 6 percent by weight $H_3PO_4$, from 0.5 to 15 percent by weight $SiO_2$ sol and at least one lower chain alcohol. With this solution porous layers are obtained, which are especially rubbing resistant and provide a glass body with increased transmittance.

An especially preferred embodiment of the solution according to the invention for making the porous $SiO_2$- and phosphorus-containing coating contains from 0.1 to 2 percent by weight HCl or from 0.1 to 2 percent by weight $HNO_3$, from 0.1 to 3.5 percent by weight $H_3PO_4$, from 0.5 to 7 percent by weight $SiO_2$ sol and at least one lower chain alcohol. With this solution porous layers are obtained, which are especially rubbing resistant and provide a glass body with increased transmittance.

According to an entirely preferred form of the invention the lower chain alcohol or alcohols acting as the solvent in the solution for making the porous $SiO_2$- and phosphorus-containing coating have a general formula $C_nH_{2n+1}OH$ with n=1, 2, 3, 4 or 5. Porous coatings are obtained with this solution, which are especially completely rubbing resistant and provide a glass body with increased transmittance.

The glass bodies according to the invention, preferably made of borosilicate glass, in the form of glass tubing, glass rod or glass panes, are used for making solar energy apparatuses. The coated glasses according to the invention are especially suitable for use in the field of solar energy, especially in waster water heating, process heat production and in parabolic channel power plant engineering.

The invention is now explained in further detail by examples.

EXAMPLES

Preparation of the Solution

A solution was prepared from 10 g isopropanol and 0.5 g 1M $HNO_3$ and stirred from 12 min. Then 0.8 g of 85% $H_3PO_4$ were added and after that stirred for 5 min. After that 1.9 grams of silica sol R40 were added (Bad Köstritz Chemical Works, $SiO_2$ content, 40%) and stirred for 5 min. Then the solution was allowed to stand for one day. The pH value of the solution was from 1 to 2.

Coating Method

A glass tube (DURAN®, Schott Glass Tubing, composition, in weight percent on an oxide basis: 80%, $SiO_2$; 13%, $B_2O_3$; 2.5%, $Al_2O_3$; 3.5%, $Na_2O$; 1%, $K_2O$) with an outer diameter of 100 mm and a wall thickness of 2.5 mm was completely immersed in the solution, left in the solution for 10 sec and subsequently withdrawn from it with a speed of 1 mm/s. Then it was tempered from 1 hour at 500° C.

Comparative Example

The glass tube of the same type and dimensions was coated with exactly the same coating method, but with a comparative solution, as in the case of the above example of the invention. The comparative solution was exactly the same as the above solution used in the coating method of the invention, except that it did not contain any phosphorus. The coating thus contained no phosphorus.

Rubbing Test

The rubbing strength or resistance was tested according to DIN 58196-5 in the case of the example. The results for the example of the invention showed that the example of the coatings of the invention fulfilled criterion 2 with an intensity of testing H50, since no coating material was eroded or rubbed off.

The rubbing resistance for the comparative example was also tested. The comparative coating fulfilled criterion 5, since the coating was worn away or worn off down to the substrate, even with an intensity of testing that was less than with the example of the invention, namely H25.

For the example according to the invention a tape test according to DIN 58196-6 was also performed. No coating material was lost with an intensity of testing K2.

The comparison of the coating of the example, which was made with the solution to which $H_3PO_4$ was added, with the comparative example, in which the solution contained no phosphorus, shows that the coatings made by the method according to the invention have surprisingly and unexpectedly more rubbing resistance as well as better adherence and wash resistance.

Thus for the first time alkali-poor and even alkali-free glasses can be coated with porous $SiO_2$-containing coatings, which fulfill the criterion 2 or better during a rubbing resistance test according to DIN 58196-5, intensity of testing H50 and experience no coating material losses during a tape test according to DIN 58196-5, intensity of testing K2. The coatings of the invention are also wash resistant, adherent and have good anti-reflection properties.

These coatings fit the requirements of the above-named application, especially the requirements that they are used for building in the glass bodies, for example into holders, roof structures and the like.

The disclosure in German Patent Application 102 09 949.9-45 of Mar. 6, 2002 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method of making a glass body with a phosphorus- and porous SiO$_2$-containing coating, glass body made thereby and solution for making same, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. An alkali-free or alkali-poor glass body having a plurality of sides and provided with an adherent and anti-reflective coating on at least one of said sides, wherein said adherent and anti-reflective coating contains phosphorus and porous SiO$_2$; and wherein said alkali-free or alkali-poor glass body contains no alkali metal oxides or less than 12 percent by weight of said alkali metal oxides and said coating is provided with pores with a pore diameter of 2 nm to 50 nm.

2. The glass body as defined in claim 1, wherein said adherent and anti-reflective coating has a rubbing resistance criterion according to DIN 58196-5, intensity of testing H50, of 2 or better.

3. An alkali-free or alkali-poor glass body having a plurality of sides and provided with an adherent and anti-reflective coating on at least one of said sides, wherein said adherent and anti-reflective coating contains phosphorus oxide and porous SiO$_2$, and said glass body contains no alkali metal oxides or less than 12 percent by weight of said alkali metal oxides, wherein said phosphorus oxide is P$_2$O$_5$ and a weight ratio of said SiO$_2$ to said P$_2$O$_5$ in said coating is from 3:1 to 1.2:1.

4. The glass body as defined in claim 3, containing at least 1 percent by weight boron oxide.

5. The glass body as defined in claim 4, containing at least 7 percent by weight of said boron oxide.

6. The glass body as defined in claim 4, containing at most 20 percent by weight of said boron oxide.

7. An alkali-free or alkali-poor glass body having a plurality of sides and provided with an adherent and anti-reflective coating on at least one of said sides, wherein said glass body contains, in percent by weight on the basis of oxides:

| | |
|---|---|
| SiO$_2$ | 70 to 85, |
| B$_2$O$_3$ | 7 to 15, |

-continued

| | |
|---|---|
| Na$_2$O + K$_2$O | 2 to <12, |
| Al$_2$O$_3$ | 1 to 8, |
| RO | 0 to 11; | wherein RO represents at least one member selected from the group consisting of MgO, CaO, SrO, BaO and ZnO; wherein said alkali-free or alkali-poor glass body contains no alkali metal oxides or less than 12 percent by weight of said alkali metal oxides; and wherein said adherent and anti-reflective coating contains phosphorus and porous Si$_{O2}$.

8. An alkali-free or alkali-poor glass body having a plurality of sides and provided with an adherent and anti-reflective coating on at least one of said sides, wherein said adherent and anti-reflective coating contains phosphorus and porous SiO$_2$; and wherein said alkali-free or alkali-poor class body contains no alkali metal oxides or less than 12 percent by weight of said alkali metal oxides and said coating has a porosity of 10 to 60 percent by volume based on a total volume of said coating.

9. The glass body as defined in claim 8, said glass body containing the following ingredients, in percent by weight on the basis of oxides:

| | |
|---|---|
| SiO$_2$ | 40 to 60, |
| B$_2$O$_3$ | 7 to 15, |
| Al$_2$O$_3$ | 8 to 20, |
| RO | 0 to 30; | wherein RO represents at least one member selected from the group consisting of MgO, CaO, SrO, BaO and ZnO.

10. The glass body as defined in claim 8, said glass body containing at least 95 percent by weight of said SiO$_2$.

11. The glass body as defined in claim 10, said glass body containing at least 99 percent by weight of said SiO$_2$.

12. An alkali-free or alkali-poor glass body having a plurality of sides and provided with an adherent and anti-reflective coating on at least one of said sides, wherein said adherent and anti-reflective coating contains phosphorus oxide and porous SiO$_2$ and said glass body contains from 0 to 1 percent by weight of at least one alkali metal oxide, wherein said phosphorus oxide is P$_2$O$_5$ and a weight ratio of said SiO$_2$ to said P$_2$O$_5$ in said coating is from 3:1 to 1.2:1.

13. The glass body as defined in claim 12, said glass body containing the following ingredients, in percent by weight on the basis of oxides:

| | |
|---|---|
| SiO$_2$ | 40 to 60, |
| B$_2$O$_3$ | 7 to 15, |
| Al$_2$O$_3$ | 8 to 20, |
| RO | 0 to 30; | wherein RO represents at least one member selected from the group consisting of MgO, CaO, SrO, BaO and ZnO.

14. The glass body as defined in claim 12, said glass body containing at least 95 percent by weight of said SiO$_2$.

15. The glass body as defined in claim 14, said class body containing at least 99 percent by weight of said SiO$_2$.

16. The glass body as defined in claim 8, wherein said coating has a coating thickness of 50 nm to 500 nm.

17. The glass body as defined in claim 16, wherein said coating thickness is 80 nm to 160 nm.

18. The glass body as defined in claim 8, and made by a method comprising the steps of:
   a) dipping the glass body in a volatile solution containing $H_3PO_4$ and $SiO_2$,
   b) withdrawing the glass body in a the volatile solution; and
   c) tempering the glass body at a temperature under $T_g$ of the glass.

19. The glass body as defined in claim 18, whereby said adherent and anti-reflective coating has a rubbing resistance criterion according to DIN 58196-5, intensity of testing H50, of 2 or better.

20. The glass body as defined in claim 18, wherein said withdrawing of said glass body from said volatile solution takes place at a withdrawing speed of from 0.1 mm/s to 100 mm/s.

21. The glass body as defined in claim 20, wherein said withdrawing speed is from 1 mm/s to 20 mm/s.

22. The glass body as defined in claim 18, wherein said solution has a pH of from 1 to 2 and contains at least one acid, said $SiO_2$ and at least one solvent.

23. The glass body as defined in claim 22, wherein said at least one solvent is at least one lower chain alcohol having a formula $C_nH_{2n+1}OH$, with n=1, 2, 3, 4 or 5 and said at least one acid is selected from the group consisting of HCl and $HNO_3$.

24. The glass body as defined in claim 18, wherein said volatile solution has a pH of from 1 to 2 and contains said $H_3PO_4$, at least one acid, said $SiO_2$ and at least one solvent.

25. The glass body as defined in claim 24, wherein said at least one solvent is al least one lower chain alcohol having a formula $C_nH_{2n+1}OH$, with n=1, 2, 3, 4 or 5 and said at least one acid is selected from the group consisting of HCl and $HNO_3$.

26. The glass body as defined in claim 18, wherein said volatile solution contains from 0.1 to 2 percent by weight HCl or $HNO_3$, from 0.5 to 15 percent by weight of an $SiO_2$ sol and from 0.1 to 6 percent by weight of said $H_3PO_4$.

27. The glass body as defined in claim 18, wherein said volatile solution contains from 0.1 to 2 percent by weight of HCl or $HNO_3$, from 0.5 to 7 percent by weight of an $SiO_2$ sol and from 0.1 to 3.5 percent by weight of said $H_3PO_4$.

* * * * *